July 6, 1926.

T. M. FINLEY ET AL 1,591,669

LUBRICATING SYSTEM

Original Filed Jan. 14, 1920   5 Sheets-Sheet 1

Inventors
T. M. Finley.
A. W. Brown.
By Harry F. Riley Attorney

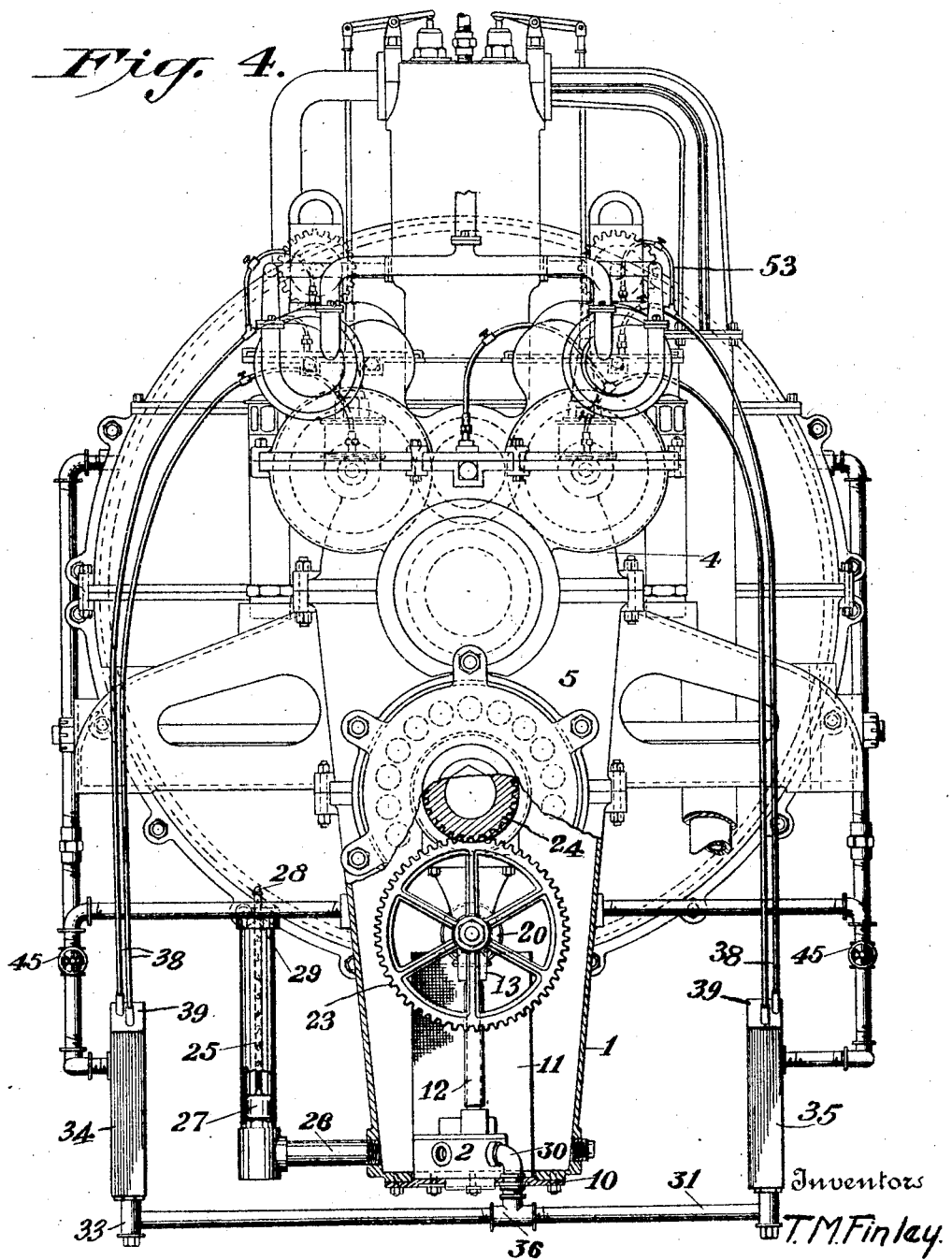

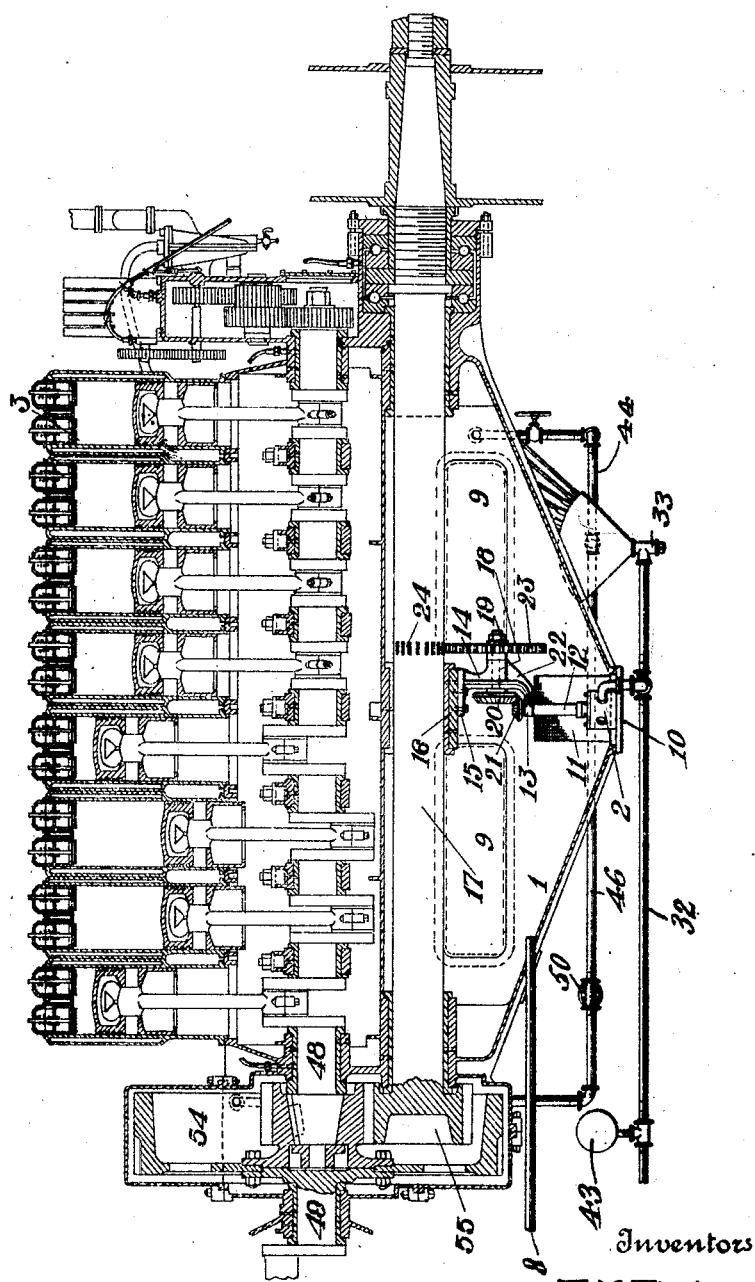

Patented July 6, 1926.

1,591,669

UNITED STATES PATENT OFFICE.

THOMAS M. FINLEY AND ALLEN W. BROWN, OF ST. LOUIS, MISSOURI.

LUBRICATING SYSTEM.

Original application filed January 14, 1920, Serial No. 351,346. Divided and this application filed January 14, 1920. Serial No. 351,347.

The invention relates to a lubricating system for engines and is a division of an application filed by us the 14th day of January, 1920, Serial No. 351,346.

The object of the present invention is to provide a simple, practical and efficient lubricating system designed particularly for aeronautical internal combustion engines and adapted to supply the desired amount of lubricant to the bearings of the same as well as to various other types of engines, and capable of delivering to the bearings the required amount under varying conditions so that the various bearings of an engine will be maintained in a properly lubricated condition.

A further object of the invention is to provide a lubricating system of this character having a forced circulation and equipped with means for varying the pressure delivered to the bearings as well as the amount of lubricant fed to the same so that the lubricating system will meet the various requirements of the character of an engine and the conditions of service as well as the character of the lubricant.

Another object of the invention is to provide a lubricating system adapted to be readily connected with a steam supply pipe so that the steam may be forced through the various pipes and tubes of the system for cleaning the same when necessary or desirable.

Furthermore, the invention has for its object to enable the pump for effecting the forced circulation to be centrally arranged and to be directly driven by the engine with a minimum number of parts all located within the oil sump or receptacle.

Another object of the invention is to provide a lubricating system adapted with a single pumping means to supply adequately with lubricant the bearings of the tandem motor power unit of the aforesaid application and to supply lubricant to the intermediate or central housing which contains the coupling gearing when such lubricant is necessary to maintain the required amount of oil within the housing or casing of the coupling gearing.

Another object of the invention is to enable both the pressure of the lubricant within the oil lead tubes and the amount of oil within the oil sump or receptacle to be readily ascertained by positive indicating means.

With these and other objects in view, the invention consists in the construction and novel combination and arrangement of parts hereinafter fully described, illustrated in the accompanying drawings and pointed out in the claims hereto appended, it being understood that various changes in the form, proportion and minor details of construction within the scope of the claims may be resorted to without departing from the spirit or sacrificing any of the advantages of the invention.

In the drawing, in which like characters of reference designate corresponding parts in the several figures:

Figure 4 is an end elevation of the same partly in section; and

Figure 5 is a longitudinal sectional view of the front or right hand engine section.

Figure 1:
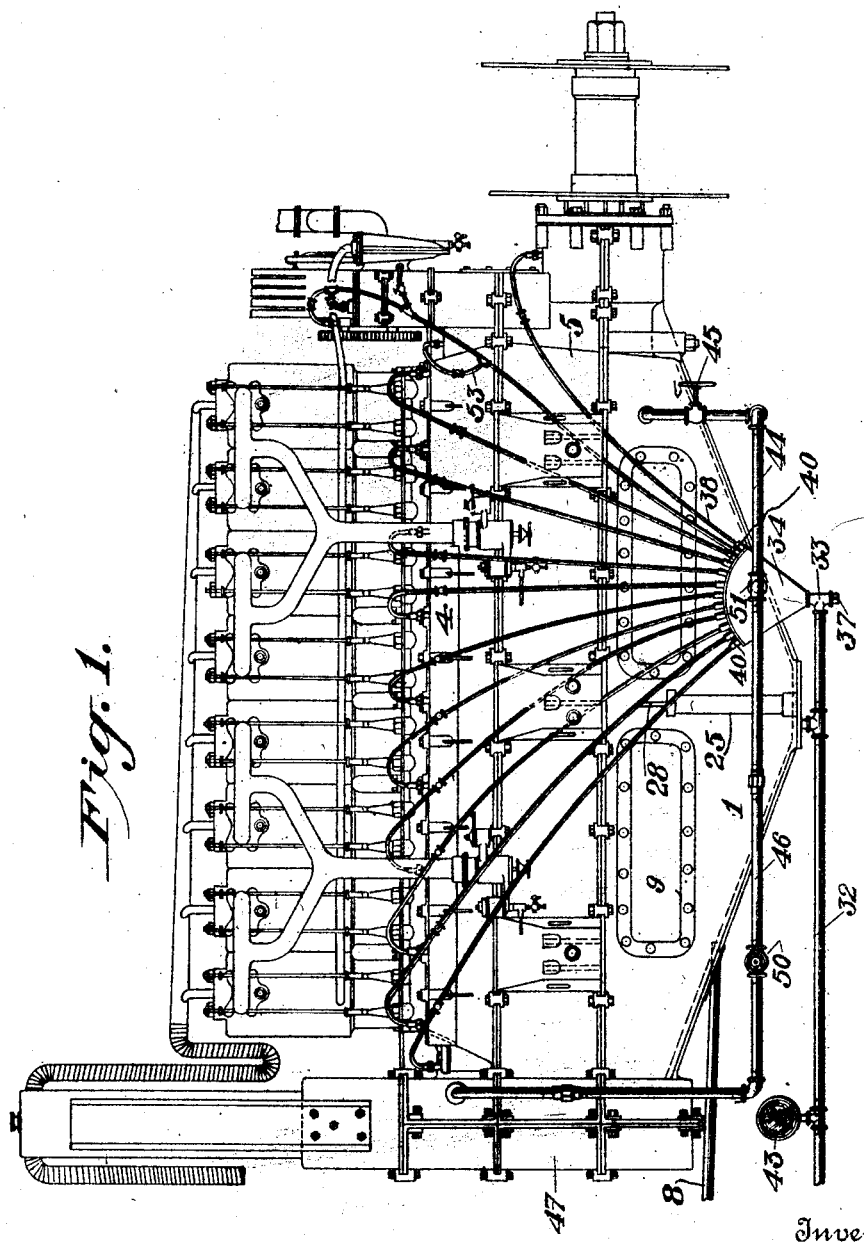
Figure 1 is a side elevation of the right hand engine section of the tandem motor power unit provided with a lubricating system constructed in accordance with this invention.
Figure 2:
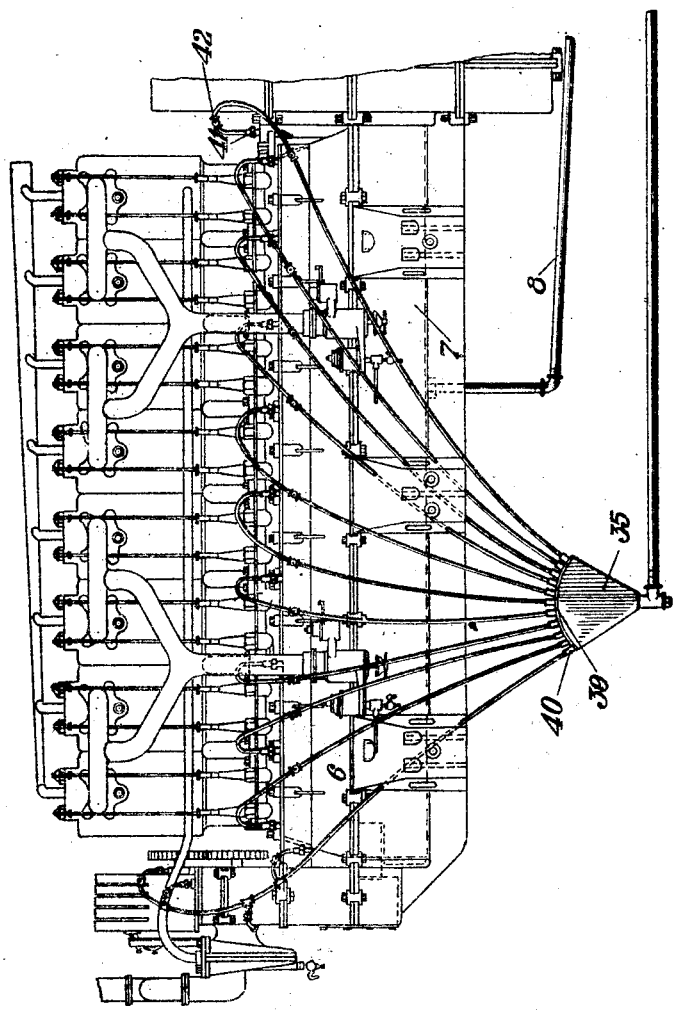
Figure 2 is a similar view of the left hand engine section and the portion of the lubricating system connected with the same.

In the accompanying drawings is illustrated the preferred embodiment of the invention, in which the lubricating system is shown applied to the tandem motor power unit of the aforesaid application. The tandem motor power unit comprises in its construction a right hand or front engine section and a left hand or rear engine section connected at the center by a coupling gearing which enables the power of the engine to be taken centrally from the same. Only the front engine section is equipped with an oil sump 1 and an oil pump 2 as the latter is sufficient to establish a forced circulation and supply lubricant to the bearings of both the front and rear engine sections. The front and rear engine sections of the tandem motor power unit are constructed as fully shown and described in the aforesaid application in which the tandem engine structure is claimed and only so much of the particular construction of the tandem motor power unit as is necessary to a full and complete understanding of the lubricating system is shown and described.

The cylinders 3 of the tandem motor power unit are sixteen in number and are arranged in longitudinal alinement and each engine section comprises two sets of four cylinders. The cylinders are mounted on a sectional crank case 4 and the lower section of the crank case of the right hand or front engine section is provided with a depending walled extension 5 which constitutes the upper section of the oil sump 1. The oil sump 1 is tapered downwardly and also longitudinally for directing the lubricant, flowing back into the oil sump to the oil pump 2. The crank case 6 of the left hand or rear engine section is provided at the bottom with an oil pan section 7 and lubricant draining into the same from the bearings of the rear or left hand engine section is returned to the oil sump of the front or right hand engine section by an inclined drain pipe 8 connected at one end with the oil pan and at the other end with the oil sump 1, but any other suitable arrangement of return pipe may of course be employed.

The oil sump is provided with removable plates 9 to afford ready access to the interior of the sump and to the oil pump 2 which is located at the bottom of the sump and mounted upon a removable bottom plate 10 bolted or otherwise secured to the oil sump at the apex or lowest point thereof. The oil pump which is arranged within a cylindrical strainer screen 11 is of the rotary type and is provided with a vertical shaft 12 extending upwardly from the oil pump and mounted at its upper end in a vertical bearing 13 of a bearing bracket 14. The bearing bracket 14 which is provided at the top with an attaching plate or portion 15 is bolted or otherwise secured to the central bearing 16 of the longitudinal propeller shaft 17 of the right hand engine section at the bottom of the said bearing 16, and the said bracket 14 is provided at an intermediate point with a horizontal bearing 18 in which is mounted a horizontal shaft 19. The horizontal shaft 19 is provided at its rear end with a vertically disposed beveled gear 20 which meshes with a horizontal beveled pinion 21 mounted upon the upper end of the vertical shaft 12 of the oil pump. The lower portion 22 of the bearing bracket is in the form of a depending L-shaped arm which supports the beveled pinion in proper position to mesh with the beveled gear 20. The front end or portion of the horizontal shaft 19 carries a vertical gear 23 which meshes with a gear 24 formed by recessing the propeller shaft 17 and consisting of an annular series of teeth as clearly indicated in Figure 5 of the drawing. The recesses which are cut into the longitudinal shaft are located adjacent the central bearing 16 and this arrangement of gearing simplifies the means for operating the pump and enables the latter to be actuated directly by the propeller shaft. Also the gearing is centrally arranged and is located entirely within the oil sump and a direct short connection between the centrally arranged oil pump and the central portion of the propeller shaft is provided. Also the short direct connection between the pump and the propeller shaft reduces the number of parts of the gear connection to a minimum.

The oil sump is equipped with an indicator comprising a vertical tube 25 connected at its lower end by a short horizontal tube 26 with the bottom of the oil sump and receiving a vertically movable float 27 carrying a vertically disposed graduated indicator member 28 extending through a cap 29 of the upper end of the vertical tube 25.

The cap which may be threaded or secured to the upper end of the tube 25 in any other desired manner, is removable to afford ready access to the float and the indicator member. In the operation of the indicator, the oil will rise in the tube 25 and carry the float and indicator member upward and the graduations on the projecting portion of the indicator member will denote the amount of oil contained within the oil sump.

The discharge pipe 30 of the oil pump is connected by a transverse pipe 31 with side feed pipes 32 located at opposite sides of the tandem motor unit and connected at their ends by suitable couplings 33 with substantially sector-shaped oil distributing casings or manifolds 34 and 35 located at opposite sides of the front and rear engine sections respectively. The discharge pipe 30 is connected to the said transverse pipe 31 by a suitable coupling 36 and the couplings 33 which are located at the lower ends of the oil manifolds or distributing casings are provided with removable plugs 37 adapted to permit a steam pipe to be readily connected to the said casings or manifolds 34 and 35 for discharging steam into the lubricating system for cleaning the manifold and the connecting pipes and particularly oil lead tubes 38 extending from the top of the casings or manifolds 34 and 35. The casings or manifolds 34 and 35 are preferably tapered downwardly as shown and they are preferably provided with arcuate top walls 39 having nipples 40 for coupling the oil lead tubes to the casings or manifolds. The oil lead tubes may be of any desired number and are designed to extend to the principal exteriorly accessible bearings of the tandem motor power unit and its components and each of the oil lead tubes is connected with its bearing by a suitable coupling 41 and is provided with a regulating valve 42 adapted to control the quantity of lubricant delivered to the said bearing.

Figure 3:
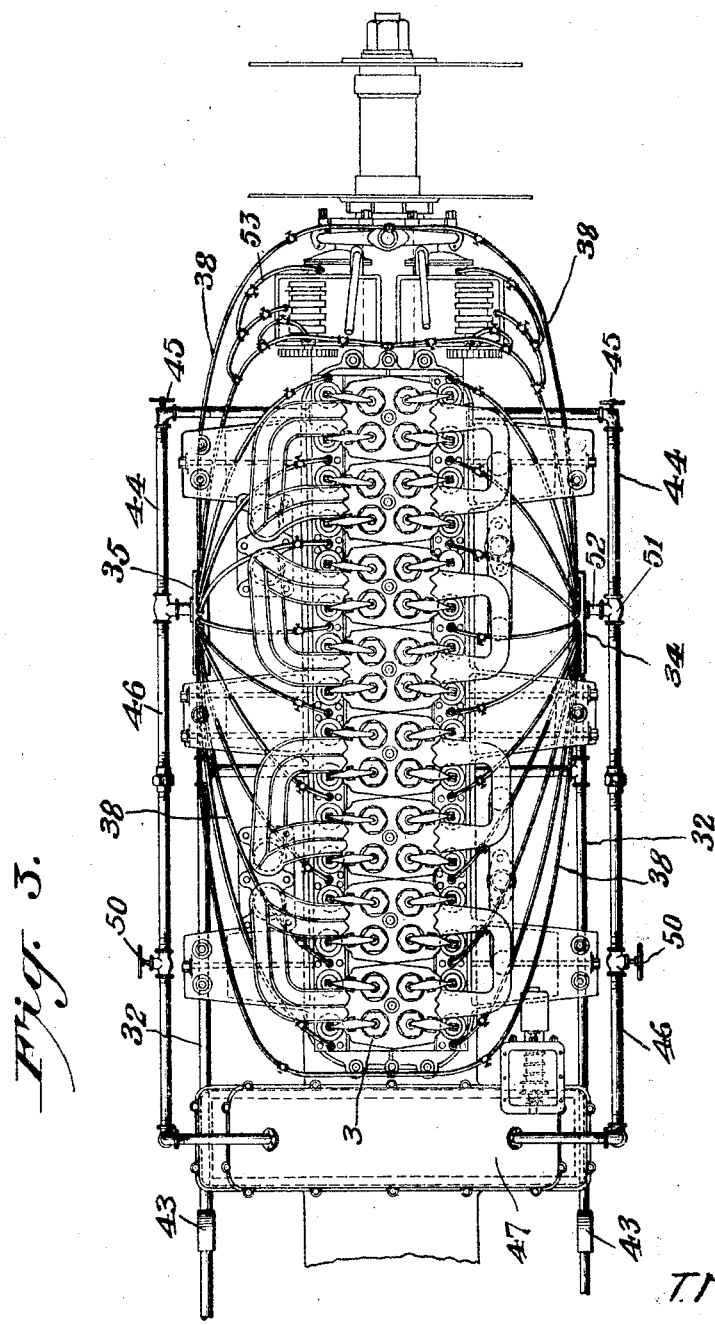
Figure 3 is a plan view of the right hand engine section.

Either or both of the side feed tubes 32 may be provided with a pressure gauge 43 and the pressure within the lubricating system is controlled by means of a sump bypass pipe 44 connected at one end with each of the casings or manifolds 34 and at the other end with the oil sump, that is to say, each side of the right hand engine section is provided with a by-pass 44 as clearly shown in Figure 3 of the drawing. Each by-pass 44 is provided with a regulating valve 45 which when open will permit the oil to pass freely from the casing 34 to the oil sump and which when closed will constrict or entirely shut off the flow of oil from the casing 34 to the oil sump by way of the by-pass 44 and by adjusting the valve 45 the pump pressure may be cut down to any desired extent to produce in the oil lead tubes the desired pressure to suit the requirements. The valves of the oil lead tubes and the valves 45 of the by-pass pipes 44 will enable the exact amount of lubricant desired to be delivered to the various bearings of the tandem motor power unit.

The casings or oil manifolds 34 and 35 are also connected by by-pass pipes 46 with the housing or sectional casing 47 of the coupling gearing which connects the crank shafts 48 and 49 of the front and rear engine sections with each other and transmits the power of the tandem motor power unit to the inner end of the longitudinal shaft 17 which extends from the inner end of the front engine section to the outer end of the same. The by-pass pipe 46 is provided with a valve 50 and the two by-pass pipes 44 and 46 have adjacent ends connected to the casing 34 by a coupling 51 and a short laterally extending pipe or nipple member 52. The pipes 44 and 46 may be arranged in any other desired manner and by closing the valve 45 and opening the valve 50, oil may be delivered in the desired quantities to the sectional casing or housing 47. The valves 50 at opposite sides of the front engine section are normally maintained closed so that the by-pass pipes 46 are not a part of the normal circulation of the system.

The oil lead tubes 38 may extend to any desired number of points and they may be provided with branches 53 as clearly shown in Figures 1 and 3 of the drawing so that a single oil lead tube may supply one or more bearings with lubricant. In the operation of the lubricating system, cool oil is forced by pressure to and through the bearings with which the said tubes are connected and the oil drains back into the oil sump from the bearings of the front engine section and into the oil pan 7 of the rear engine section and is returned to the sump through the drain pipe 8.

The front crank shaft 48 has keyed or otherwise secured to its inner end a gear or pinion 54 which meshes with a gear or pinion 55 carried by the inner end of the longitudinal shaft 17 which is arranged in parallelism with the front crank shaft 48 and when the engine is in operation the longitudinal shaft 17 which takes the power from the crank shafts 48 and 49 at the adjacent ends thereof operates the oil pump through the centrally arranged gearing in the oil sump and a positive lubrication of the bearings of the power unit is effected while the power unit is in operation.

What is claimed is:—

1. The combination of a tandem engine having front and rear engine sections the front engine section being provided with an oil sump and having a power shaft located within the oil sump and connected with and extending longitudinally of the crank shaft for transmitting the power of the engine therefrom, an oil pump located within the oil sump, means for conducting lubricant from the pump to the bearings of the front and rear engine sections, a vertical shaft extending upwardly from the pump, centrally arranged gearing directly connecting the vertical shaft with the said power shaft, said gearing including a relatively short horizontal shaft located at the upper end of the vertical shaft and gears connecting the vertical shaft and horizontal shafts with each other and the horizontal shaft with the power shaft.

2. The combination of a tandem engine having front and rear engine sections the front engine section being provided with an oil sump and having a power shaft located within the oil sump and connected with and extending longitudinally of the crank shaft for transmitting the power of the engine therefrom, an oil pump located within the oil sump, and arranged beneath the power shaft, means for conducting lubricant from the pump to the bearings of the front and rear engine sections, and gearing connecting the oil pump directly with the said power shaft.

3. The combination of a tandem engine having front and rear engine sections the front engine section being provided with an oil sump and having a power shaft located within the oil sump and connected with and extending longitudinally of the crank shaft for transmitting the power of the engine therefrom, an oil pump located within the oil sump, a vertical shaft extending upwardly from the pump, centrally arranged gearing directly connecting the vertical shaft with the power shaft at a point intermediate of the ends thereof, said gearing including a relatively short horizontal shaft located at the upper end of the vertical shaft, gears connecting the vertical and horizontal shafts with each other, and the horizontal shaft with the power shaft, a centrally arranged bracket mounted in the oil sump directly beneath the power shaft and supporting the horizontal shaft and the gearing for connecting the same with the vertical shaft and the power shaft, and oil lead tubes communicating with the bearings of the engine sections and with the said pump.

4. The combination of an engine having an oil sump or receptacle, an oil pump actuated by the engine, a tapered oil casing or manifold connected with the oil pump, and oil lead tubes extending from the enlarged end of the oil casing or manifold to the bearings of the engine.

5. The combination of an engine having an oil sump or receptacle, an oil pump actuated by the engine, a substantially sector-shaped oil distributing casing or manifold connected at the apex of the oil pump and a plurality of oil lead tubes connected with the base or enlarged end of the casing or manifold.

6. The combination of an engine having an oil sump or receptacle, an oil pump actuated by the engine, a substantially sector-shaped oil distributing casing or manifold tapered downwardly and connected at the bottom or apex with the pump and having a curved wall at the top or enlarged end of the casing or manifold, and oil lead tubes extending from the said curved wall to the bearings of the engine.

7. The combination of an oil sump, and having a power shaft extending longitudinally therein, an engine, an oil pump within the oil sump, intermediate of the ends of the power shaft actuated directly by the same, an oil distributing casing or manifold connected with the oil pump, oil lead tubes extending from the casing or manifold to the bearings of the engine, and means for controlling the pressure within the oil lead tubes and for reducing such pressure below the pump pressure.

8. The combination of an engine, an oil sump and having a power shaft extending longitudinally therein, an oil pump within the oil sump, intermediate of the ends of the power shaft actuated directly by the same, a casing or manifold connected with the pump, oil lead tubes extending from the casing or manifold to the bearings of the engine, and a by-pass pipe connecting the casing or manifold with the oil sump and having controlling means for regulating the pressure in the oil lead tubes.

9. The combination of an engine, an oil sump and having a power shaft extending longitudinally therein, an oil pump within the oil sump, intermediate of the ends of the power shaft actuated directly by the same, side feed tubes connected with the pump, casings or manifolds located at opposite sides of the engine and connected with the said pipes, and oil lead tubes extending from the casings or manifolds to the bearings of the engine.

10. The combination of a tandem engine having front and rear engine sections, the front engine section being provided with an oil sump, an oil pump actuated by the tandem engine and connected with the oil sump, casings or manifolds located at opposite sides of the front and rear engine sections, means for connecting the said casings or manifolds with the pump, and oil lead tubes extending from the casings or manifolds to the bearings of the engine sections.

11. The combination of a tandem engine having front and rear engine sections, the front engine section being provided with an oil sump, and the rear engine section having an oil pan, a drain pipe connecting the oil pan with the oil sump, an oil pump actuated by the engine and connected with the oil sump, casings or manifolds connected with the pump, and oil lead tubes extending from the casings or manifolds to the bearings of the engine.

12. The combination of a tandem engine having front and rear engine sections and provided with coupling gearing, a housing for the said gearing, an oil sump located beneath the front engine section, an oil pump located in the oil sump and actuated by the gearing, a casing or manifold connected with the oil pump, oil lead tubes extending from the casing to the bearings of the engine, and a by-pass pipe connected with the said housing and with the casing or manifold and having means for controlling the flow of lubricant through the said by-pass pipe.

13. The combination of a tandem engine having front and rear engine sections and provided with coupling gearing and provided with a housing for the same, an oil sump located beneath one of the engine sections, a pump within the oil sump actuated by the engine, a casing or manifold connected with the oil pump, oil lead tubes extending from the casing to the bearings of the engine, and by-pass pipes connecting the casing or manifold with the housing and with the oil sump.

14. The combination of a tapering manifold or casing, oil lead tubes extending from the enlarged end of the casing or manifold to the bearings, and a pipe connected with the reduced end of the tapering casing or manifold and having means for the attachment of a steam pipe.

In testimony whereof we affix our signatures.

THOMAS M. FINLEY.
ALLEN W. BROWN.